Patented Nov. 5, 1929

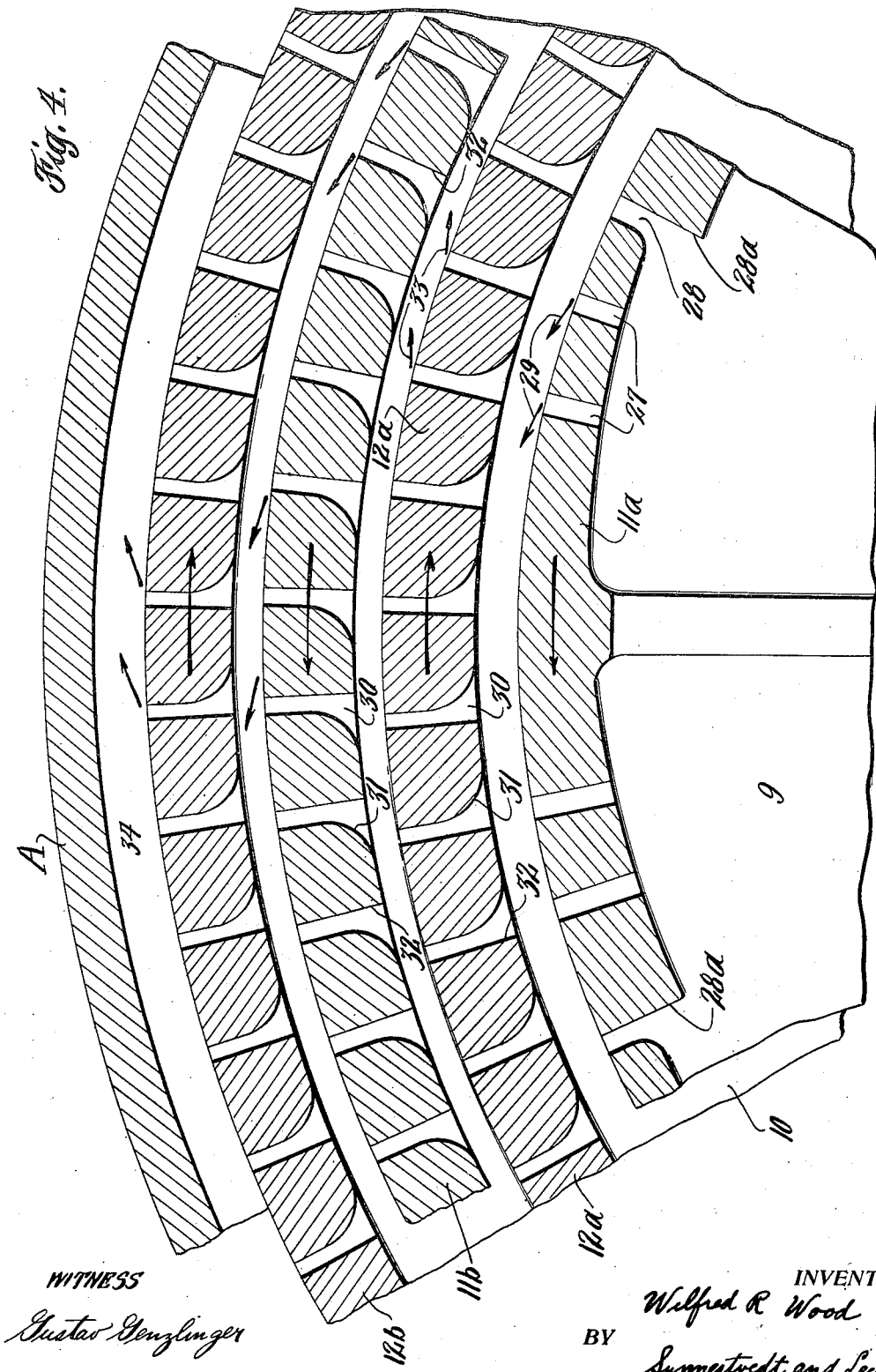

1,734,661

UNITED STATES PATENT OFFICE

WILFRED R. WOOD, OF LONDON, ENGLAND, ASSIGNOR TO INTERNATIONAL COMBUSTION ENGINEERING CORPORATION, OF NEW YORK, N. Y., A CORPORATION OF DELAWARE

IMPACT PULVERIZER

Application filed August 1, 1923. Serial No. 655,011.

This invention relates to impact pulverizers and it is particularly useful in connection with the pulverization of coal for firing furnaces such, for example, as are used under boilers for the generation of steam.

One of the primary objects of my invention is to provide a pulverizer which will effectively pulverize at lower speeds than heretofore and, therefore, with less vibration, wear and breakage and with less consumption of power.

Another object of the invention is to reduce the weight of the parts.

In general, my invention contemplates a pulverizer of the impact type in which maximum impact force is obtained with minimum revolving speed; and which is simple and inexpensive to construct and assemble, and economical to maintain.

Figure 1:
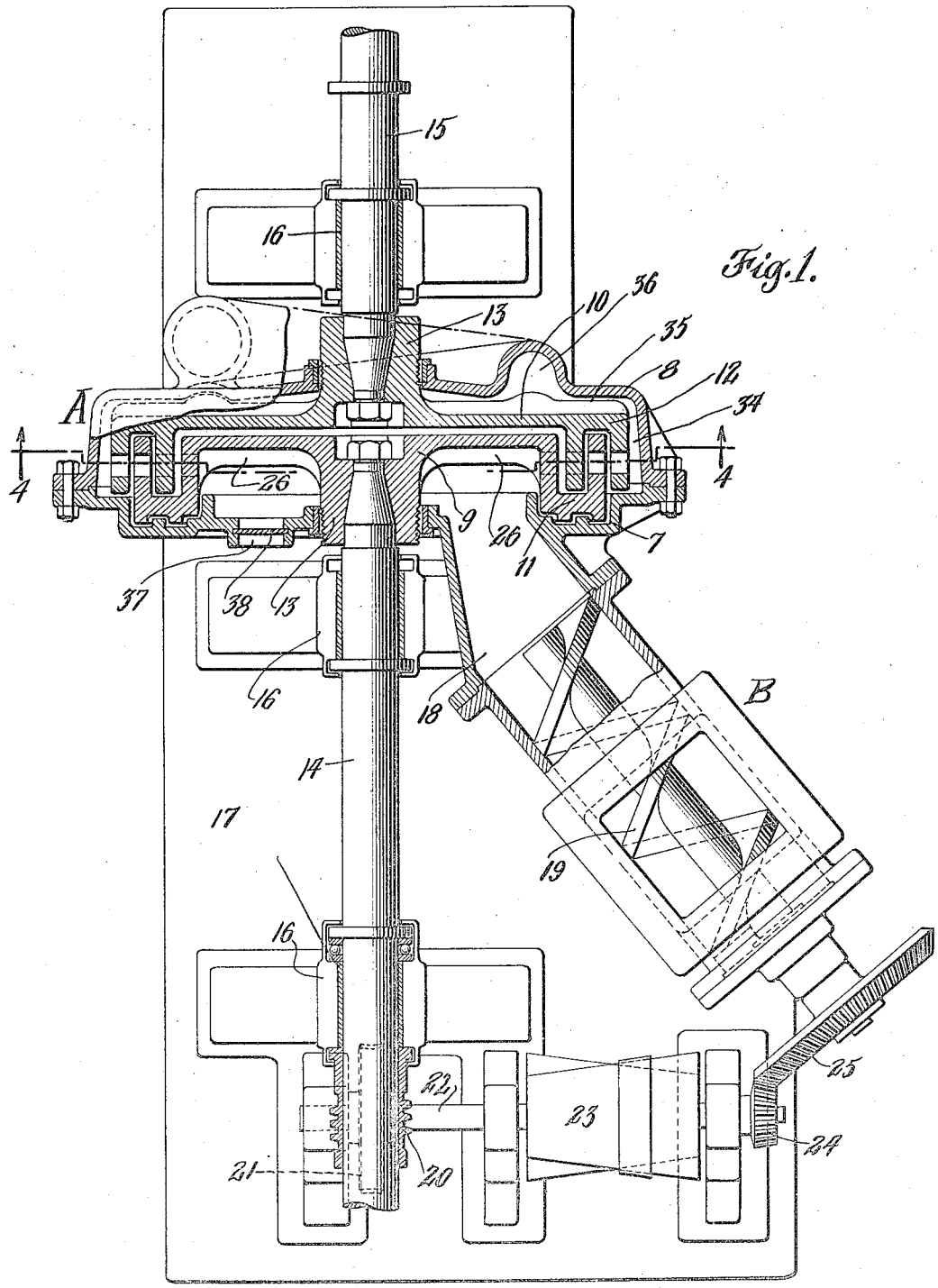
Figure 2:
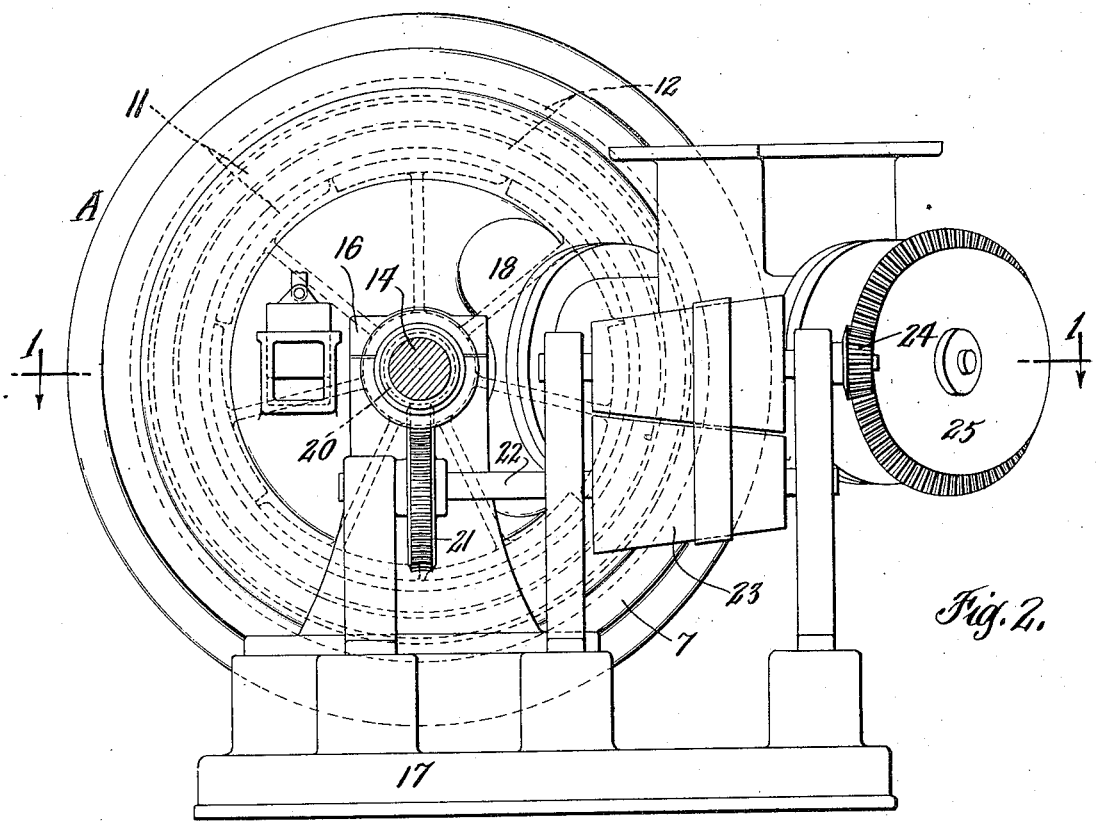
Figure 3:
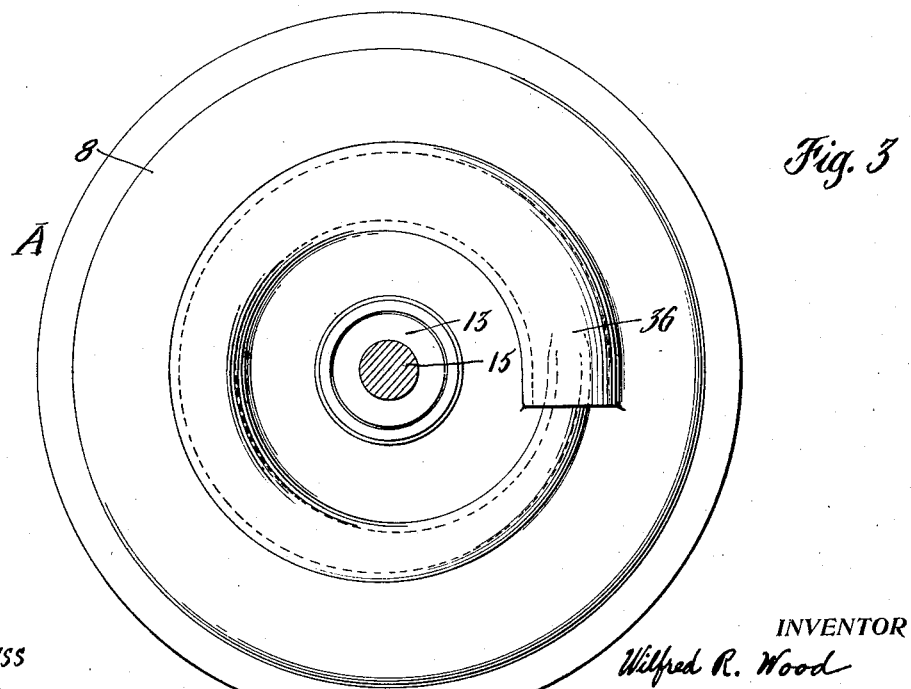

The foregoing, together with such other objects as may hereinafter appear or are incident to my invention, I obtain by means of a construction which I have illustrated in preferred form in the accompanying drawings, wherein:

Fig. 1 is a horizontal plan section of my improved apparatus, taken on the line 1—1 of Fig. 2; Fig. 2 is an end elevation of Fig. 1; Fig. 3 is an end elevation of the discharge side of the machine; and Fig. 4 is a section taken on the line 4—4 of Fig. 1 drawn on an enlarged scale.

Referring now to Figs. 1 and 2, the reference character A denotes the housing or casing, such casing being composed of the two castings 7 and 8, suitably bolted together. Within the casing are two wheels 9 and 10. Each wheel is of disc-like construction and the wheels are respectively provided at their peripheries with U-shaped flanged portions 11 and 12, such flanged portions being complementary so that the two wheels can be nested, as shown. The hubs 13 of the two wheels are respectively fitted to the ends of the two shafts 14 and 15, such shafts being supported in suitable bearings 16, mounted on the base 17 of the machine. The two shafts are oppositely revolved by any suitable form of driving mechanism, not shown but preferably of variable speed.

The casing member 7 is provided with an inlet 18 disposed so as to deliver the coal supplied by the feeder mechanism, indicated as a whole by the reference letter B, to the interior of the casing at a point between the hub and the flange 11 of the wheel 9.

The screw 19 of the feeder is operated in any suitable manner, preferably from the shaft 14 by means of the worm 20, the worm wheel 21, the shaft 22, the variable cone drive mechanism 23, the pinion 24 and the gear 25. By this arrangement the screw may be operated in accordance with the speed of revolution of the shaft 14 or varied, as conditions may require.

Assuming that the wheels are revolving, the coal entering the inlet 11 is first struck crushing blows by the ribs 26 on the wheel 9. These ribs may be radially or otherwise disposed. The inner leg 11$^a$ of the U flange 11 of the wheel 9 is composed of tapering sections, as will be clear on inspection of Fig. 4, each section being provided with a plurality of radial openings 27, and there being openings 28 between sections. The coal shattered by the blades or ribs 26 works out toward the periphery, primarily by virtue of the centrifugal force, and partly passes through the openings 27 and partly through the openings 28, the more finely shattered particles having a tendency to pass out through the openings 27 while the coarser particles are apt to strike against the impact surfaces 28$^a$ at the ends of the sections described, by which they may be further shattered and from which they work outwardly through the openings 28.

The particles working out through the openings 27 and 28 are tangentially discharged at high velocity, in the general direction indicated by the arrows 29.

The inner leg 12$^a$ of the U flange 12 on the wheel 10 is provided with a plurality of radial openings 30, the mouth of each of which is enlarged by virtue of the curved surface 31. The tangentially discharged coal, travelling substantially in a direction reverse of the movement of the wheel 10, is impacted on the surfaces 32, and is further shattered and coincidentally deflected into the openings 30, passing therethrough either by virtue of the force of their own movement or by centrifugal action, or both.

The outer leg 11ᵇ of the U flange 11 of the wheel 9 is similarly provided with radial openings 30, and the particles of coal discharging from the periphery of the leg 12ᵃ of the flange 12 of the wheel 10, are discharged tangentially in the general direction of the arrows 33, entering the mouths of and striking on the impact surfaces 32 of the openings 30 in the leg 11ᵇ. Here they are further shattered and the process is repeated with respect to the outer leg 12ᵇ of the flange 12 on the wheel 10, for which purpose the leg 12ᵇ is provided with similarly shaped openings.

The coal passing out through the leg 12ᵇ is discharged tangentially into the casing A and works around the annular space or chamber 34 from which it works into the space or chamber 35 between the member 8 and the wheel 10, from which space it works its way into the helical or circular discharge channel 36 which increases in depth and width, as shown in Figs. 1 and 3.

I prefer to admit just sufficient air to carry the coal through the machine, as the greater the amount of air in a centrifugal machine of this type, the greater will be the power consumption. A portion of the air may enter with the coal, but the greatest proportion enters through the inlet 37 which is controlled by a valve mechanism, such as the gate valve 38, by which the amount of air can be regulated. The air thus drawn into the machine mixes with the coal and the particles are carried along in suspension to the discharge outlet or channel 36.

The outer face of the wheel 10 (see Fig. 1) is provided with ribs 39 which are bulged opposite the discharge channel 36 to assist in causing the pulverized coal to enter into such channel. These ribs 39 have the further function of returning coarse particles back to the periphery of the casing. Such coarse particles are either shattered by the blades themselves or are reduced to appropriate fineness by attrition. Only particles reduced to a fineness such as to be carried by the air current set up in the machine when operating, will pass to the discharge channel.

In pulverizing coal, I prefer to have the wheel 10 of an outside diameter of about three feet and to have the shafts 14 and 15 revolving in opposite directions at about 1500 R. P. M. I am aware that an impact pulverizer arranged to pulverize by a single impact has been proposed, but for such a machine of corresponding size a speed of about 3000 R. P. M. would be required. By my arrangement, however, with each wheel traveling at half that speed, an impact approximately four times as great is obtained, i. e., the impact force developed when a tangentially moving particle strikes an impact surface moving in the opposite direction, would be approximately four times as great. The reduction in speed greatly reduces the vibration which is a very serious factor; enables me to install the pulverizer in places where, otherwise, the vibration would be prohibitive; reduces the size and weight of parts, the wear, breakage and maintenance; and effectively pulverizes the coal to the required degree of fineness in one pass through the machine, with less consumption of power. The fineness can, of course, be regulated by altering the speed of revolution.

What I claim is:

1. An impact pulverizer including in combination, a pair of oppositely revolving wheels each having a U-flange, the one nested in the other, and each flange having a plurality of openings therethrough from which openings the material to be pulverized is centrifugally projected substantially tangentially against impact surfaces on the other wheel.

2. An impact pulverizer including in combination, a casing, a peripherally flanged wheel having substantially radial ribs forming impact surfaces on its face and a plurality of openings in the flange, and means for supplying the material to be crushed into the cavity to a point within the flange, together with a second oppositely revolving flanged wheel having peripheral openings.

3. A pulverizer for pulverizing coal including a flanged wheel having peripheral openings from which the coal is centrifugally projected substantially tangentially, and a second oppositely revolving flanged wheel having peripheral openings providing impact surfaces against which the tangentially discharged fuel impacts and by which the particles are deflected into the openings for discharge therefrom.

4. A single pass impact pulverizer including a pair of oppositely revolving wheels each having a peripheral U-shaped flange, the one nested in the other, and the legs of the flanges having a plurality of openings through which the fuel progressively passes and is projected tangentially toward the walls of the openings of the successive flange portions for impact.

5. A pulverizer including a casing having an inlet in one face intermediate the center and the periphery thereof for the material to be pulverized and an outlet in the opposite face for the pulverized material, a pulverizing means within the casing, and means for directing the pulverized material to the outlet.

6. A pulverizer including a casing having an inlet in one face intermediate the center and the periphery thereof and an outlet in the opposite face, an impact pulverizing wheel within the casing, and impact surfaces on a face thereof adapted to return coarser particles to the periphery of the machine.

7. In a pulverizer, a wheel having a sectional peripheral flange, the sections whereof taper.

8. In a pulverizer, a wheel having a sectional peripheral flange, the sections whereof taper, and spaces between the sections.

In testimony whereof, I have hereunto signed my name.

WILFRED R. WOOD.